United States Patent [19]

Kleptz

[11] 4,363,822

[45] Dec. 14, 1982

[54] METHOD FOR PRODUCING A RESTRUCTURED MEAT PRODUCT

[76] Inventor: Charles F. Kleptz, 11700 Haber Rd., Union, Ohio 45322

[21] Appl. No.: 229,198

[22] Filed: Jan. 28, 1981

[51] Int. Cl.³ .......................... A23B 4/06; A22C 7/00
[52] U.S. Cl. .................................. 426/513; 426/393; 426/413; 426/414; 426/516; 425/110; 425/129 R; 264/176 R; 264/313
[58] Field of Search .............. 426/513, 516, 393, 414, 426/413; 425/110, 129 R; 264/176 R, 313

[56] References Cited

U.S. PATENT DOCUMENTS

| | | | |
|---|---|---|---|
| 1,486,476 | 3/1924 | Bloss | 426/284 |
| 1,864,284 | 6/1932 | Taylor | 426/393 |
| 2,062,249 | 11/1936 | Clearwater | 426/393 |
| 2,182,891 | 9/1938 | Eikel . | |
| 2,445,752 | 7/1948 | Adams . | |
| 2,771,366 | 11/1956 | Shadid . | |
| 2,812,260 | 11/1957 | Keane, Sr. et al. . | |
| 2,917,388 | 12/1959 | Sullivan et al. | 426/513 |
| 3,290,721 | 12/1966 | Siegal | 426/513 |
| 3,370,960 | 2/1968 | Jaccard | 426/513 |
| 3,480,449 | 6/1967 | Sumption . | |
| 3,864,494 | 2/1975 | Kupcikevicius et al. | 426/413 |
| 3,911,154 | 10/1975 | Weatherspoon | 426/513 |
| 3,911,154 | 10/1975 | Weatherspoon | 426/513 |
| 3,959,505 | 5/1976 | Valiant | 426/513 |
| 4,058,633 | 11/1977 | Staff et al. | 426/513 |
| 4,210,677 | 7/1980 | Huffman | 426/513 |
| 4,285,980 | 8/1981 | Lewis | 426/513 |

*Primary Examiner*—Steven L. Weinstein
*Attorney, Agent, or Firm*—Jacox & Meckstroth

[57] ABSTRACT

Chopped pieces of meat are placed within a mixer having an outlet with a feed screw, and an elongated discharge tube is coupled to the outlet. The outer end of the discharge tube supports a plate having a predetermined shape corresponding to the shape of a meat product such as a steak or pork chop forming an individual serving portion. A plastic bag is pulled over the discharge tube and end plate, followed by a clamped tubular mold having a longitudinal joint and an inner surface corresponding to the shape of the end plate. The outer end of the mold is closed, and the mixed meat product is extruded through the tube into the bag within the mold while the mold is moved from the tube and end plate under restraining back pressure. The mold is unclamped, and the bag and meat product are slid from the mold onto a tray conforming to the shape of the lower portion of the mold. The meat product is frozen on the tray, after which the bag is removed, and the meat product is cut into individual serving portions.

5 Claims, 5 Drawing Figures

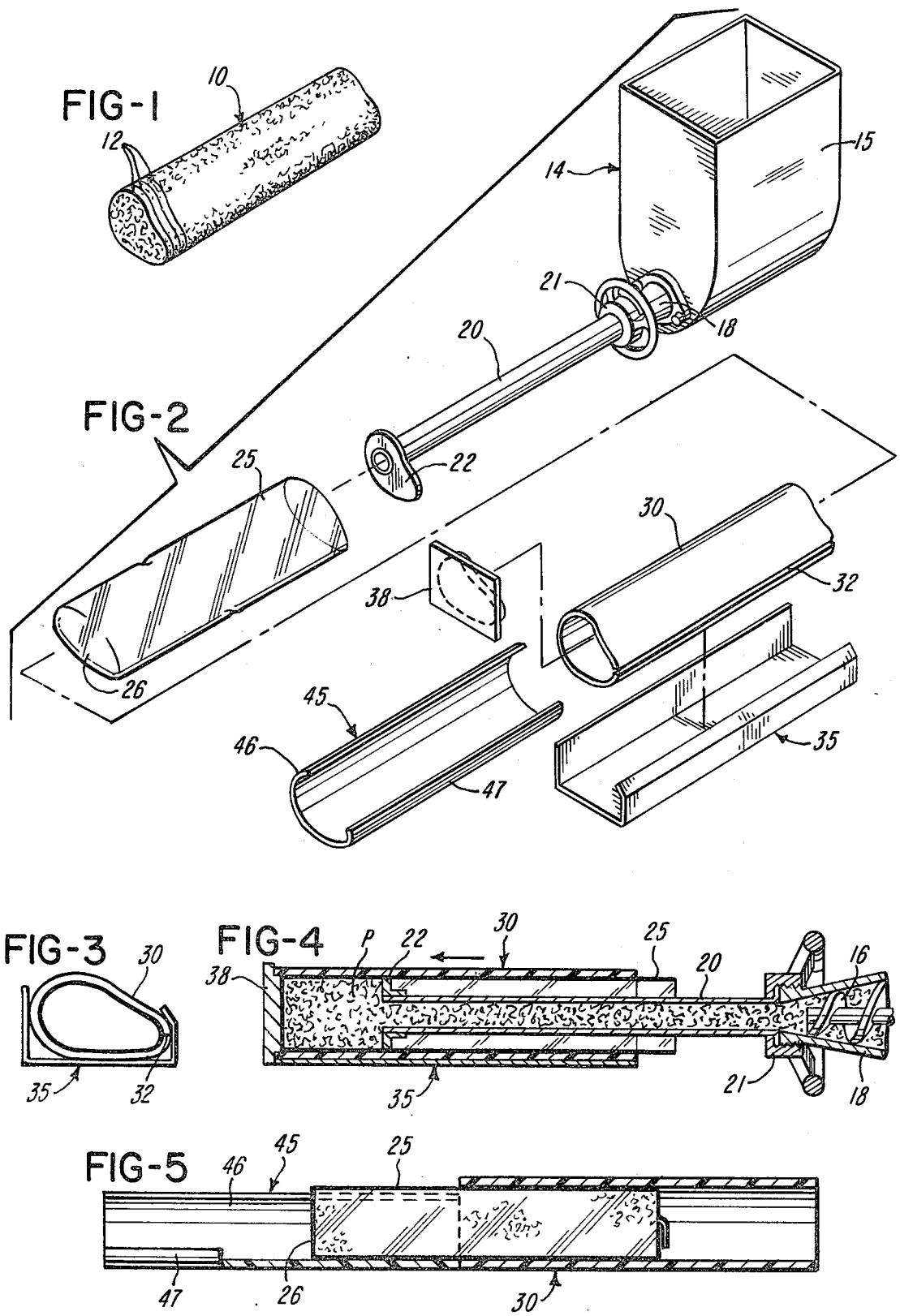

METHOD FOR PRODUCING A RESTRUCTURED MEAT PRODUCT

BACKGROUND OF THE INVENTION

In the production of a formulated or restructured meat product such as, for example, an individual serving of a restructured strip steak or pork chop, usually a large frozen piece of meat is cut into blocks, and the frozen blocks are placed within a chipper to produce smaller meat pieces or flakes. The flakes are mixed within a mixer with a binder usually comprising water, salt and sodium phosphate. A mixture of meat and binder is placed within casings and partially frozen to a firm state after which the casing is removed and the partially frozen meat product is pressed within an elongated mold having the shape of a commonly served meat product such as a strip or rib eye steak or pork chop. The semi-frozen meat product is then cut into individual servings or portions which are returned to the freezer for complete freezing.

It has been found that the above process or method for producing restructured beef products, including the double freezing operations and the use of the chipper or flaker, results in a tearing action on the meat, thus requiring additional salt binder and/or more sodium phosphate than desired to prevent the sodium phosphate from affecting the taste of the meat product. Furthermore, the more salt and/or sodium phosphate used, the shorter the shelf life of the meat product.

SUMMARY OF THE INVENTION

The present invention is directed to an improved method and apparatus for producing a restructured meat product and which eliminates the above mentioned disadvantages, including the double freezing of the meat and the need for using sodium phosphate and/or salt as a binder to retain the meat in an individual serving portion after the meat portion is thawed and cooked. The method of the invention also simplifies the apparatus required for efficiently producing a restructured meat product and thus enables a relatively small meat packing plant to produce a high quality and economical restructured beef or pork product having the flavor and consistency of a fresh cut steak or pork chop. While the method and apparatus of the invention are desirable for producing a restructured frozen beef product, the method and apparatus are ideally suited for producing a restructured frozen pork product having the appearance and taste of a fresh pork chop.

In accordance with one embodiment of the invention, a restructured meat product is produced by chopping large pieces of relatively lean meat and suet into smaller pieces, and the chopped pieces are then placed within a mixer to which may be added water and/or salt if desired. The bottom of the mixer is provided with a motor driven helical feed screw which discharges the mixed meat product through an outlet to which is attached an elongated horizontal discharge tube. The outer end portion or the discharged tube supports an end plate having an outer configuration which corresponds to the desired shape of the restructured meat product.

A plastic film bag is pulled over the end plate and the discharge tube, and a tubular mold is placed over the bag so that the mold surrounds the discharge tube with the bag as a liner within the mold. A closure plate or cap is placed on the outer end of the tubular mold which has an inner surface corresponding to the shape of the end plate on the discharge tube or to the desired configuration of the restructured meat product. The meat product is extruded through the discharge tube and into the bag within the tubular mold, and as the bag fills up with the product, the mold and bag are premitted to move or telescope outwardly from the discharge tube.

When the bag is filled, the drive for the extruder screw is de-energized, and the bag of formed meat product is slid from the tubular mold onto a tray which conforms with the lower portion of the tubular mold and serves to maintain the shape of the formed meat product. While the formed meat product within the bag is being supported by the tray, the meat product is frozen, after which the bag is removed, and the elongated meat product is cut at longitudinally spaced intervals into individual serving portions each having the shape of the tubular mold.

Preferably, the tubular mold is formed by heating and reforming a cylindrical rigid plastic pipe after which the pipe is cut longitudinally to form a joint which allows the tubular mold to spring open slightly after it is unclamped. This slight releasing of the mold permits the bag of formed meat product to be easily removed from the mold and slid directly onto the conforming support tray.

Other features and advantages of the invention will be apparent from the following description, the accompanying drawing and the appended claims.

BRIEF DESCRIPTION OF THE DRAWING

FIG. 1 is the perspective view of a frozen restructured meat product produced in accordance with the invention and illustrating a portion of the product cut into individual serving portions.

FIG. 2 is an exploded perspective view of the apparatus used for producing the meat product shown in FIG. 1;

FIG. 3 is an end view of a tubular mold shown in FIG. 2 and illustrating the mold in its clamped or closed position;

FIG. 4 is an axial section of the assembled apparatus shown in FIG. 2 and illustrating the extrusion of a mixed meat product into a plastic film bag within the tubular mold; and FIG. 5 is a longitudinal section of the tubular mold and illustrating the sliding of the formed meat product from the mold onto a conforming support tray.

DESCRIPTION OF THE PREFERRED EMBODIMENT

FIG. 1 illustrates a restructured meat or pork product 10 produced in accordance with the invention and which is partially cut into individual servings portions 12 each having a predetermined shape or configuration, for example, similar to the shape of a pork chop. The meat product 10 is formed by the equipment or apparatus shown in FIG. 2, which includes a conventional mixer 14 such as manufactured, for example, by Hobart Corporation in Troy, Ohio. The mixer 14 includes a top opening tank 15 having motor driven mixing paddles or blades (not shown) and a bottom portion which confines a helical conveyor or feed screw 16 (FIG. 4). The screw 16 is preferably driven by a motor separate from the motor which drives the mixing paddles or blades and is controlled by a foot operated switch or an adjustable timer switch.

A discharge housing 18 projects from the mixer tank 15 and surrounds the outer end portion of the feed screw 16. The housing 18 supports an axially aligned cylindrical discharge tube 20 which is coupled to the housing by an annular fitting which is threaded onto the housing 18. The other end portion of the rigid discharge tube 20 supports an end plate 22 which has a shape or configuration corresponding to the desired cross-sectional configuration or shape of the meat product 10.

An elongated plastic film bag 25 has a closed outer end wall or portion 26 and a circumference which is slightly greater than the peripheral length of the end plate 22 on the discharge tube 20. An elongated tubular mold 30 is formed from a rigid plastics material and has an inner surface which also conforms to the shape or configuration of the end plate 22 with only a slight clearance between the end plate 22 and the inner surface of the mold 30. A preferred method for economically producing a mold 30 is to heat a cylindrical rigid PVC pipe within an oven to a temperature of approximately 250–300 degrees F. The cylindrical pipe may then be easily reformed to the desired shape of the tubular mold 30, after which the heated tube is cooled in water so that the tube retains its reformed non-cylindrical shape.

The rigid tubular mold 30 is slit or cut longitudinally to form a joint 32 (FIG. 5) which allows the mold 30 to spring open by a slight amount to form a gap at the joint 32. The tubular mold 30 is retained in its closed position by a partially surrounding clamp 35 which is preferably formed from stainless steel sheet metal and clamps onto the mold 30 as shown in FIG. 3. A closure or end cap 38 (FIGS. 2 and 4) releasably mounts on the outer end portion of the tubular mold 30, and a similar cap member may be used for the opposite end of the mold 30.

Referring to FIGS. 4 and 5, a frozen meat product 10 is formed in accordance with the invention and with the apparatus shown in FIG. 2 in the following described manner. When the meat product 10 consists of a pork product, pieces of pork are placed within a food cutter (not shown), for example, of the type having a rotating bowl defining an annular chamber which receives a rotating knife conforming to the chamber, such as manufactured, for example, by Hobart Corporation in Troy, Ohio. The chopped pieces of meat or pork are placed within the open top tank 15 of the mixer 14 and are thoroughly mixed to a uniform consistency or mixture.

A plastic film bag 25 is pulled over the end plate 22 and discharge tube 20 until the end portion 26 of the bag seats on the end plate 22. The tubular mold 30 within the clamp 35 is then placed or extended over the bag 25 so that the bag 25 lines the mold 30 which surrounds the discharged tube 20 with the closure cap 38 adjacent the end plate 22. The motor which drives the screw 16 is actuated, and the mixed meat product P is extruded through the tube 20 and into the bag 25 within the mold 30, as shown in FIG. 4. The operator supports the mold 30 with one hand, and the other hand retains the end cap 38 on the mold 30. As the meat product fills the bag 25 within the mold 30, the mold is permitted to respond or move outwardly on the end plate 22 while a slight back pressure is held against the end cap 38 to assure that the mold 30 is completely filled without any voids.

When the lined tubular mold 30 is completely filled, the motor driving the screw 16 is de-energized, and the mold 30 and bag 25 are separated from the end plate 22 on the discharge tube 20. The open end of the bag 25 projecting from the mold 30 is then folded inwardly against the meat product within the bag, and another end cap 38 may be applied to the mold 30 to assure that both ends of the formed meat product are square.

After the tubular mold 30 and the liner bag 25 are filled with the meat product, the outer end cap 38 and the clamp 35 are removed from the mold and the mold is placed on a table in longitudinal alignment with an elongated tray member 45 having a contour corresponding to the contour of the lower portion of the tubular mold 30. Preferably, the tray 45 is formed in the same manner as the tubular mold 30 is formed, except that a top section of the mold is removed to provide the tray 45 with upwardly curved opposing side walls 46 and 47.

When the clamp 35 is released from the mold 30 by pivoting the clamp away from the mold, the mold springs open slightly to form a small gap at the joint 32. With the pressure released on the formed meat product P within the bag 25, the bag 25 and the formed meat product are slid longitudinally from the mold 30 onto the tray 45, as shown in FIG. 5. The length of the tray 45 is substantially the same length as the tubular mold 30, which corresponds to the desired length of the formed meat product within the bag 25. While the tray 45 retains the formed configuration of the molded meat product within the bag 25, the tray is placed within a freezer so that the meat product is frozen within the bag 25. After the meat product is frozen, the bag 25 is easily removed by cutting the bag longitudinally of the meat product and peeling the bag from the frozen meat product. The frozen meat product 10 may then be cut into individual portions 12 on a band-type meat saw.

From the drawing and the above description, it is apparent that a meat product produced in accordance with the present invention provides desirable features and advantages. For example, the method of the invention is ideally suited for producing a restructured pork product without the need for any binder such as salt or sodium phosphate and water, and thus significantly increases the shelf life of the frozen pork product. The absense of a binder also assures the natural taste of the pork product. The elimination of the need for sodium phosphate as a binder in a beef product produced in accordance with the invention, also enhances the flavor of the beef product in addition to extending the shelf life of the frozen product.

The invention also enables a relatively small meat packing company to produce efficiently a high quality restructured meat product without a substantial investment in additional equipment. That is, most meat packing companies have a mixer such as the mixer 14 with a discharge feed screw in the bottom of the mixer tank. A relatively small investment is required for producing in accordance with the invention one or more of the tubular molds 30, end caps 38, and stainless clamp 35 and for producing a number of the conforming trays 45. In addition, a supply of plastic film bags 25 may be economically produced according to the size and length of the tubular mold 30. As mentioned above, one or more of tubular molds 30 and conforming trays 45 may be economically produced simply by heating pre-cut lengths of commercially available PVC pipe, reforming or reshaping the heated pipe sections and then cutting the sections longitudinally after the reformed pipe sections are cooled. Furthermore, the discharge tube 20 and one or more of clamps 35 may be easily and economically produced from stainless sheet steel so that the total cost of equipment for producing restructured meat products in accordance with the inventor, is relatively low, thus providing for a more economically produced meat product.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. A method of producing a frozen restructured meat product adapted to have a predetermined non-cylindrical shape, comprising the steps of mixing pieces of meat within a mixer having a screw extruder extending adjacent an outlet, attaching an elongated discharge tube to the outlet, surrounding the discharge tube with a flexible bag, surrounding the bag and the discharged tube with a tubular mold having an inner non-cylindrical surface corresponding to the predetermined shape, mounting on the outer end portion of the discharge tube a retaining member conforming substantially to the inner non-cylindrical surface of the tubular mold, closing the outer end of the tubular mold with an end closure member, extruding the mixed meat product through the discharge tube and into the bag and mold while moving the bag and mold longitudinally relative to the discharged tube, filling the bag while confining the mixed meat product within the mold between the retaining member and the end closure member to produce a predetermined pressure within the product, sliding the bag and formed meat product from the mold, and freezing the formed meat product within the bag while maintaining the shape of the product.

2. A method as defined in claim 1 and including the steps of forming an elongated tray member having a contour corresponding to the shape of a lower portion of the mold, and supporting the bag and formed meat product with the tray member after the formed meat product and bag are removed from the mold and while the formed meat product is being frozen.

3. A method as defined in claim 2 and further including the step of placing the tray member in longitudinal alignment with the mold, and sliding the bag and formed meat product from the mold directly onto the tray member to maintain the formed configuration of the meat product before freezing.

4. A method as defined in claim 1 and including the steps of forming the tubular mold with a continuous wall having a uniform thickness and a longitudinally extending joint to provide for flexing the mold and releasing the mold from the bag and formed meat product before sliding the bag and formed meat product from the mold, and confining the mold within a clamping member extending around a substantial portion of the mold to secure the mold together while extruding the meat product into the bag.

5. A method as defined in claim 1 and including the step of forming the tubular mold by heating a section of cylindrical thermoplastics pipe and then reforming the pipe to the predetermined non-cylindrical shape.

* * * * *